Sept. 9, 1958 W. L. BERLINGHOF, JR 2,851,380
CONDUCTIVE INK AND ARTICLE COATED THEREWITH
Filed Feb. 9, 1953
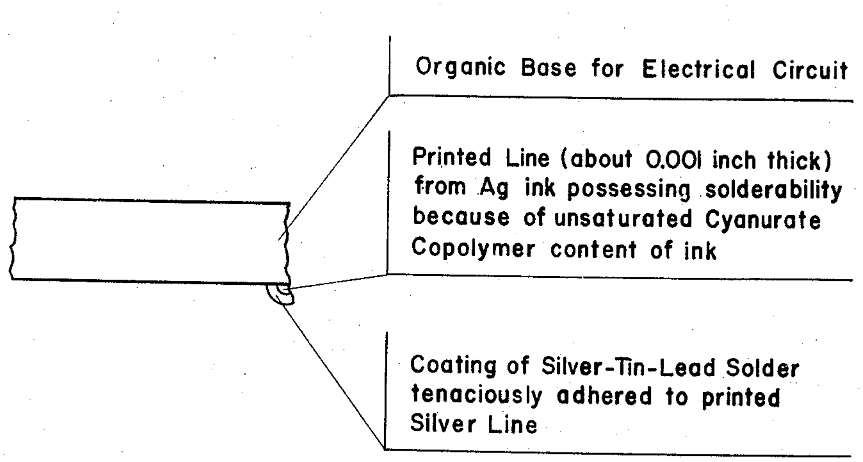
INVENTOR.
*William L. Berlinghof*
BY John R. Ewbank
ATTORNEY United States Patent Office 2,851,380
Patented Sept. 9, 1958

2,851,380

CONDUCTIVE INK AND ARTICLE COATED THEREWITH

William L. Berlinghof, Jr., Huntingdon Valley, Pa., assignor to Woodmont Products, Inc., Huntingdon Valley, Pa., a corporation of Pennsylvania Application February 9, 1953, Serial No. 336,002

4 Claims. (Cl. 117—212)

This invention relates to an improved conductive ink for printed electrical circuits and to improved forms of printed electrical circuits derived from such conductive ink.

A conductive ink may be defined as an ink capable, upon proper drying, baking or firing, of conducting electrical current in the manner of a wire or other conductor. The object upon which the conductive ink is applied may be any suitable base material such as plastics, ceramics, or other non-conductive material.

Conductive ink may be diluted with solvents and applied by silk-screening or by spraying rather than by printing. Ink used in these methods may be termed "paint," and hereinafter the term "conductive ink" will include said paint.

In its commonest form, a conductive ink consists of pure silver particles dispersed in a liquid vehicle. The use of silver is general, since the oxides of silver are conductive while those of copper or other practical conductors are not conductive. In the very fine powders required for conductive inks, it is not practical to avoid oxidation upon contact with air; hence the widespread use of silver or, in the case of resistance inks, of chemically stable carbon.

Vehicles or binders for conductive inks have fallen into two categories. The first type requires the use of a "firing" temperature of 750° F. to 1500° F. to fuse the silver to glass or ceramic surfaces. Such temperatures do not permit the use of the more desirable plastic base materials and therefore limit the usefulness of the inks, although such inks are solderable.

The second type of vehicle consists of a mixture of resin and solvent, the latter evaporating upon exposure to air with or without heat. Since no "firing" temperature is required, such inks are convenient to use on plastic base materials, but without heavy coating of electroplated metal such as copper over the ink, they are not sufficiently heat-stable to permit direct soldering at 425° F. to 525° F. by iron or by dipping. Such solder-dipping is most important as it provides one of the greatest economies exhibited by printed circuitry: That of connecting and assembling all the electrical components to the base panel in one rapid step.

To accomplish this dip-soldering step, another type of electrical circuit is in common use, known as the etched metal-clad printed circuit. This type does not use a conductive ink, but consists of a solid metal sheathing laminated to a plastic base material, printed with an acid-resistant ink and subjected to an acid etching bath to remove all metal except that directly under the ink lines. The solid metal lines thus produced have high conductivity and can be subjected to soldering temperatures for the few seconds necessary to dip-solder. The strong acids used for etching are generally detrimental to the base material, imparting undesirable electrical properties thereto. Furthermore, piercing and punching of the metal-clad circuits frequently weakens the bond of metal to base material, and difference in thermal expansion creates undesirable strain in the metal to base-material bond, reducing the useful life of said circuit.

As used in this specification, alkyd is a generic term, and polyester refers to that species of alkyd which contains no fatty acid groups.

An object of this invention is to provide a highly conductive ink which has strength and adhesion at the temperatures required for soldering but does not require a high "firing" temperature to cure, thereby permitting its use on common plastic base materials such as phenolic, polyester, epoxy, silicone or other plastic laminates as well as on ceramics, glass, and other base materials. Such an ink offers the most direct and economical method for producing dip-soldered printed circuits, by-passing all extra steps encountered in mechanical embossing, acid-etching, electroplating, or other indirect methods used to obtain solderable printed circuits. Furthermore, the operation of dip-soldering to connect the various components to the printed circuit performs the function of depositing upon my printed lines a continuous coating of solder which greatly increases the conductivity of the printed line and widens its range of application.

This concept of a solderable printed circuit which utilizes a printed line to connect solder to plastic base material is, to the best of my knowledge, new, and its advantages in both quality and economy are obvious to those skilled in the art. The fact that the solder layer is applied in the normal course of operations without requiring an extra step makes the process highly economical. The provision of such a dip-soldered printed circuit is a further object of this invention.

Another object of the invention is to provide a solderable conductive ink which possesses improved properties of viscosity, tackiness and flow which make it more convenient that existing conductive inks to print by letterpress, offset, rotary, silk-screen process or other methods normal in the graphic arts.

A further object of the invention is to provide a conductive ink which has improved properties of electrical conductivity and of adhesion to plastic base materials.

Many other advantages will be apparent in a conductive ink capable of withstanding temperatures of 500° F. to 550° F. without charring or weakening. Exhibiting excellent adhesion to silicone laminates, such ink permits higher operating temperatures with silicone printed circuits than have been heretofore possible even with metal-clad silicone.

One of the unique requirements of a conductive ink vehicle is the ability to bind the particles of silver together and provide good adherence to the base material, yet permit the particles to touch, overlap, or lie so close together that the effect of the non-conducting vehicle is very small and the electrical resistivity low. This property is closely related to the ability of the vehicle to wet the silver particles, yet allow excess vehicle to "drain" to the base-material surface, leaving a minimum of silver-bonding resin in the top of the printed line. Such "drainage," in turn, is a function of the viscosity change during cure.

I have found the above requirements met in conductive inks produced by dispersion of pure flake silver powder in substantially non-volatile thermosetting polyester resins containing triallyl cyanurate monomer either by itself or in substantial proportion with common unsaturated alkyd resins. Such conductive inks, when catalyzed and cured, provide unique heat-resistance, solderability, excellent electrical conductivity, non-flammability, unusual adhesion to plastic and other base materials, and excellent viscosity characteristics as a printing ink. They may be cured below 350° F. without need for pressure or exclusion of air.

By "substantially non-volatile thermosetting resin" I mean one whose vapor pressure at the highest curing temperature is low enough to prevent evaporation of material sufficient to cause significant changes in properties of the cured resin.

The drawing includes legends which make the drawing self-explanatory.

The invention can be further clarified by a series of examples.

*Example I*

The following were mixed by glass muller on plate glass at 90° F.:

| | Parts by weight |
|---|---|
| Triallylcyanurate monomer | 300 |
| Silver flake, 300 mesh | 700 |
| Methyl ethyl ketone peroxide in dimethyl phthalate | 5 |

The ink was applied by silk-screen to XXXP phenolic board and had good adhesion both at room temperature and 450° F. after curing four hours at 330° F. However, the viscosity of the ink was not as desirable as when blended with unsaturated alkyd resins. When so mixed the viscosity of the vehicle is raised to a range of 1000 to 8000 centipoises. The unusual heat-resistant properties of the mixture are brought about by the use of the triallyl cyanurate monomer, and this characteristic extends throughout a wide range of polymerizable unsaturates containing the stable triazine structure. Thus, it is possible to blend the unsaturated triazine monomers with many of the common unsaturated polyester alkyds well known to the trade, to vary the viscosity of the resin and yet retain the dominant heat-resistance characteristic. Without incorporation of such unsaturated triazine monomers, I have found it possible to produce conductive inks with a wide range of non-volatile polyesters, especially blends of diallyl phthalate monomer, but such inks have always exhibited weakness and instability at temperatures approaching 400° F. and have thus been too critical to handle safely at soldering temperatures required by normal practice. The unique stability of unsaturated triazine monomers blended with other monomers or unsaturated alkyd resins not subversive of the high temperature-resistance characteristic is well documented in U. S. Patent 2,510,503, Kropa to American Cyanamid Company, and the variations possible are demonstrated. Although in the following examples of conductive inks, the resin vehicles contain unsaturated polyester alkyds which cross-link with triallyl cyanurate monomer, such blends are not to be considered a limitation, but rather indicate the unique properties obtained in conductive inks made with commercially available resins of such unsaturated triazine structure.

*Example II*

An ink was prepared using as the resin a triallyl cyanurate polyester resin. As explained in an article by P. M. Elliott beginning at page 113 of the July 1952 issue of the "Modern Plastics" magazine, the U. S. Rubber Company markets such a resin as "Vibrin X–1047" which contains unsaturated cyanurate copolymerized with modifying amounts such as slightly less than half maleic alkyd polyester. The ink contained:

| | Parts by weight |
|---|---|
| Triallyl cyanurate-maleic alkyd resin | 270 |
| Silver flake, 300 mesh | 730 |
| Butyl Cellosolve (monobutyl ether of ethylene glycol) | 27 |
| Methyl ethyl ketone peroxide in dimethyl phthalate | 3 |

The above example provides for the presence of non-reactive solvent, butyl Cellosolve, in the ink prior to curing, to aid in the dispersion of silver particles and to permit higher concentrations of silver without undue increase in viscosity. For silk-screening applications, the solvent should be non-volatile at room temperature but should evaporate completely at the curing temperature before polymerization starts. The presence of 5% to 40% of solvent based on weight of resin also increases the pot life of the catalyzed mixes by restraining polymerization.

*Example III*

A letterpress ink was prepared using a triallyl cyanurate polyester resin. As explained in an article by H. M. Day and D. G. Patterson beginning at page 116 of the July 1952 issue of the "Modern Plastics" magazine, the American Cyanamid Company markets such a resin as "PDL–7–669" which is characterized by triallyl cyanurate, there being a modifying amount, such as slightly less than half maleic alkyd polyester copolymerized with the triallyl cyanurate. The letterpress ink contained:

| | Parts by weight |
|---|---|
| Triallyl cyanurate blend with alkyd resin | 280 |
| Silver flake, 300 mesh | 720 |
| Acetone | 43 |
| Methyl ethyl ketone peroxide in dimethyl phthalate | 4 |

The above ink was mixed by propellor-type stirrer at 75° F. and applied by letterpress or by silk-screen process to phenolic, polyester-Fiberglas, silicone-Fiberglas, acrylic, CR39, and glass. After curing 3 hours at 300° F. excellent adhesion was observed with all the above base-materials and all were solderable. The ink had a catalyzed pot life of at least three weeks when maintained at 30° F., and not less than three days at room temperature. In the absence of acetone, the ink tended to solidify and form an unsatisfactory lumpy mixture when cooled below 50° F. However, warming and remixing at 75° F. to 100° F. recovered all the desirable properties of flow and produced excellent conductivity in the printed lines after curing.

By silk-screening, the ink of Example II was cured to a line thickness of approximately 0.0008" and had a resistivity of less than 0.016 ohm per square. By letterpress application, the ink of Example III was cured to a line thickness below 0.0001" and had a resistivity of less than 0.10 ohm per square. Upon dip-soldering with a eutectic tin-lead solder containing approximately 4½% silver, both screened and printed lines exhibited resistivity of less than 0.003 ohm per square.

*Example IV*

The high temperature stability, optimum balance of adhesiveness to the base and tremendous shrinkage upon curing and other features of the resin of the present invention make such resin useful for other electrical inks, such as those employed in the preparation of printed resistances. A resistance ink was prepared from:

| | Parts by weight |
|---|---|
| Triallyl cyanurate blend with alkyd resin | 200 |
| Finest superspectra carbon black | 56 |
| Butyl Cellosolve (monobutyl ether of ethylene glycol) | 30 |
| Methyl ethyl ketone peroxide in dimethyl phthalate | 4 |

The above was mixed by glass muller and silk-screened onto 1/16" silicone-Fiberglas plastic. After curing 6 hours at 350° F., the ink had a resistivity of 20,000 ohms per square. Use of larger particles of carbon, particularly of the graphite form, is common when greater conductivity is desired: By variation of particle size and mesh of the silk screen, control of electrical resistivity is obtained.

*Example V*

In my conductive inks, unusual adhesion to base materials is obtained by the mechanism of polymerizing and cross-linking of the resin while in contact with the base material surface in the absence of volatile solvents which normally dilute the solid-liquid interface of solvent-type inks. Even in my proposed mixtures containing solvents, such unusual adhesion is observed since the solvent restrains polymerization until it has evaporated from the non-volatile resin.

Although the inks dry hard to the touch within ten minutes at 250° F., they cannot be satisfactorily soldered until cured from one to three hours at 300° F., or from ½ to two hours at 400° F. The fuller cures give greater strength, adhesion, heat-resistance and electrical conductivity.

Pure powdered flake silver between 200 and 600 mesh is preferred, although unhammered precipitated silver also gives satisfactory results. Presence of a stearic acid coating, commonly added to flake silver, reduces the conductivity of the ink. A preferred range of stearic acid content in the silver is not more than 1% by weight. Although polymerization of the resins proceeds with normal peroxide catalyzation, I found the reaction rate provided by 0.2% to 3% by weight of methyl ethyl ketone peroxide in dimethyl phthalate to give printed lines with highest conductivity. The range of silver content was from 2½ to 6 parts by weight of silver to 1 part resin, with electrical conductivity higher with greatest proportion of silver to resin. The metallic silver "filler" in my proposed inks reduces the characteristically high shrinkage during polymerization of the resin and thus aids in producing good bond strength to base materials, as well as rendering the cured inks non-flammable.

As an example of a new article of manufacture produced by use of the proposed solderable conductive inks, the following was made:

A domestic radio circuit was printed by letterpress with rubber plate upon a 4" x 8" x 1/16" sheet of thermoset paper-base phenol-formaldehyde laminate of high insulation resistance phenolic using the ink described in Example III, and depositing upon the base material less than 0.0003" thickness of ink. The printed base material was heated for 3 hrs. at 300° F., cooled in air, and the surface of the ink was cleaned by burnishing lightly with pumice. The circuit was then quickly covered with an activated rosin flux, to prevent oxidation of the silver. At this time, the printed line exhibited a resistance of about 0.100 ohm per square, which is unusually low for such a thin line but not sufficiently conductive for average radio or television circuits. The printed piece was therefore dipped for three to five seconds in a solder bath of tin-lead eutectic saturated with 5% silver to prevent dissolving of the surface silver in the ink: Temperature of the solder bath was 450° F., and excess solder was shaken off upon withdrawal of the piece from the bath. The lines of the circuit were covered with approximately 0.004" of the solder and the resistance dropped to 0.003 ohm per square, sufficiently low to enable its use in the radio. Attachment of the various components of the radio in the same step required only the normal procedure of positioning the pins and connecting wires into suitable holes through the base material before dipping into solder. An electrically or chemically induced flash of copper over the silver ink aids in wetting of the metallic line by the solder and simplifies the dipping procedure.

While specific quantities and proportions have been stated herein, it is to be understood that these figures represent merely preferred embodiments of my invention. I do not intend to be restricted thereby except as specified in the claims.

What is claimed is:

1. A silver ink consisting essentially of from about 2½ to about 6 parts by weight of finely divided silver per 1 part of triallyl cyanurate polyester resin, said ink, when in the form of cured lines, having the property of reliably and uniformly retaining a coating of solder after being dipped in tin-lead-silver molten solder to make reliable electrical connections.

2. A silver ink consisting essentially of from about 2½ to about 6 parts by weight of finely divided silver flake per 1 part of triallyl cyanurate polyester resin, said ink, when in the form of lines, after curing, fluxing, dipping in molten tin-lead-silver solder, and cooling, having the property of tenaciously and reliably retaining solder for reliably making electrical connections.

3. A silver ink consisting essentially of from about 2½ to about 6 parts by weight of finely divided silver per 1 part of unsaturated cyanurate resin containing modifying amounts of unsaturated materials copolymerizable with the unsaturated cyanurate, said ink, when in the form of a printed line cured at 350° F., having the property of reliably retaining a coating of solder after cooling from contact with molten tin-lead-silver solder, whereby electrical connections can be made reliably by dip soldering of such cured printed ink lines.

4. A printed circuit consisting of a base member, at least one line printed on said base member, said lines consisting essentially of finely divided silver and triallyl cyanurate polyester resin, there being from 2½ to 6 parts by weight of finely divided silver per 1 part of triallyl cyanurate polyester resin, and a coating of tin, lead, silver solder on at least one of said printed lines, all of said solder adhering to the printed lines tenaciously and reliably for reliably making electrical connections.

References Cited in the file of this patent

UNITED STATES PATENTS

| | | |
|---|---|---|
| 1,837,678 | Ryder | Dec. 22, 1931 |
| 2,443,741 | Kropa | June 22, 1948 |
| 2,485,294 | Kropa | Oct. 18, 1949 |
| 2,510,503 | Kropa | June 6, 1950 |
| 2,608,539 | Bain | Aug. 26, 1952 |
| 2,632,751 | Anderson | Mar. 24, 1953 |

OTHER REFERENCES

"Printed Circuit Technique," Nat. B. of Stds. Circ. 468, 1947, pages 5–16. (Copy in Div. 25.)

"Modern Plastics," April 1954, vol. 31, No. 8, "Wizardry in Circuitry." (Reprint in Div. 48.) 10 pages.